United States Patent
Keyek-Frannsen

[11] Patent Number: 6,148,772
[45] Date of Patent: Nov. 21, 2000

[54] BICYCLE MOUNTED DOG-TETHERING APPARATUS

[75] Inventor: Dean Keyek-Frannsen, Lafayette, Colo.

[73] Assignee: Alberta Peaks, Inc., Lafayette, Colo.

[21] Appl. No.: 09/156,980

[22] Filed: Sep. 18, 1998

[51] Int. Cl.[7] ............................ B60R 22/00; B62H 19/34
[52] U.S. Cl. ............................................. 119/771; 280/292
[58] Field of Search ..................................... 119/771, 772, 119/769, 777, 778, 779, 780; 54/61, 70; 280/292, 204

[56] References Cited

U.S. PATENT DOCUMENTS

| | | |
|---|---|---|
| 147,928 | 2/1874 | Fry . |
| 244,843 | 7/1881 | Battelle . |
| 1,295,622 | 2/1919 | Simonsen . |
| 1,918,843 | 7/1933 | Holmes . |
| 3,337,175 | 8/1967 | Acheson . |
| 4,134,364 | 1/1979 | Boncela . |
| 4,186,690 | 2/1980 | Seiler ....................................... 119/772 |
| 4,721,320 | 1/1988 | Creps et al. ............................ 280/204 |
| 4,854,269 | 8/1989 | Arntzen . |
| 5,033,409 | 7/1991 | Sabot . |
| 5,181,684 | 1/1993 | Sager . |
| 5,215,037 | 6/1993 | Allred . |
| 5,941,196 | 8/1999 | Domanski ............................... 119/708 |

*Primary Examiner*—Peter M. Poon
*Assistant Examiner*—Yvonne R. Abbott
*Attorney, Agent, or Firm*—Harness, Dickey & Pierce, P.L.C.

[57] ABSTRACT

A dog exercising/walking device for mounting to a bicycle. The device includes a mounting bracket having portions that engage and retain the device to the bicycle's frame. A resilient member having first and second ends is coupled to the mounting bracket at its first end such that its second end extends laterally away from the mounting bracket. The member is resiliently flexible in directions lateral to the length of the member. A dog tethering attachment ring is secured to the second end of the member allowing lead strap from the dog to be attached thereto.

16 Claims, 5 Drawing Sheets

BICYCLE MOUNTED DOG-TETHERING APPARATUS

BACKGROUND AND SUMMARY OF THE INVENTION

The present invention relates to a dog-tethering device. More specifically, the present invention relates to a dog-tethering device for attachment to a bicycle or similar apparatus allowing the bicycle to be used for exercising or simply walking the dog for pleasure.

Dogs are typically exercised by their owners through the act of walking or running. However, walking and running may not provide sufficient exercise for some dogs, especially those of the sporting or working breeds. For a lot of people, bicycle riding is preferred over walking or running. A dog, which is exercised by its owner while the owner rides a bicycle, is provided with a more rigorous workout in a shorter period of time. In prior practice, this was done by the person riding the bicycle holding onto the dog's leash with one hand and the bicycle's handlebars with the other. Alternatively, the dog's leash was tied to the bicycle's handlebars. Obviously this creates a very dangerous and unstable condition for both the rider and the dog. Any small tug by the dog can cause the rider to lose control of the bicycle, leading to possible serious injury to either the rider or the dog There have been numerous attempts to design and develop dog-tethering/exercising/walking devices that may be attached to a bicycle to eliminate the need for the rider to hold directly onto the leash or to tie the leash to the handlebar of the bicycle. Prior designs have been mounted to the seat post, to the upper cross bar of the frame, and to the front forks of the bicycle. These prior devices, however, have fallen short of providing a suitable dog-tethering device. Prior seat post and frame mounted devices have been located in positions that can permit the dog to upset the balance of the bicycle thereby compromising steering and even possibly pulling the bicycle over onto its side. The same result can be found when the device is coupled to the upper cross bar of the bicycle frame. An exercising device that mounts to the front forks of the bicycle can seriously impede steering.

These prior devices are also constructed of tubular metal, a stiff material which readily transfers any movement of the tethered dog to the bicycle when there is no slack in the lead-strap.

From the above it is apparent that there exists a need for a device which allows a dog to be tethered to a bicycle, yet which provides for more stable operation of the bicycle when the dog pulls on the lead strap. It is therefore a principal object of the present invention to provide such a device, a stable dog exercising/walking device that mounts to a bicycle, while minimizing the possibility that the dog can pull over or otherwise cause a loss of control of the bicycle or harm to the animal.

It is another object of the present invention to isolate and attenuate motion and energy between the dog and the bicycle to prevent instability caused by sudden motions of the bicycle or the dog.

An additional object of the present invention is to provide a device which allows for the quick and easy removal of all or part of the device from the bicycle when not in use.

SUMMARY OF THE INVENTION

The present invention is a bicycle mounted dog exercising/walking device which accommodates pulling by the dog so that the stability of the bicycle is not compromised and which is readily removed from the bicycle when not in use.

Generally, the present invention includes a mounting bracket which is designed to be attached at a lowermost position on the frame. Mounted to the bracket is a flexible rod having a ring at its end that is used to tether the dog to the bicycle. The flexibility of the rod is sufficient to attenuate the majority of forces caused by the dog thereby isolating the bicycle from most motions by the dog while still allowing the rider to "feel" the dog. Similarly, the dog is protected from sudden pulls by the bicycle.

More specifically, the device of the present invention is a bicycle mounted device which includes a mounting bracket adapted to be attached to the rear frame of the bicycle, near the mounting position of the rear wheel. The portions of the bracket are such that two parts of the rear frame of the bicycle are captured or sandwiched between the portions of the mounting bracket. An attachment collar, protruding laterally outward from the mounting bracket, is configured to removably receive and retain a member or rod having a dog tether attachment mechanism on its end. Importantly, the rod is made from a material and is provided with a length and a diameter (or thickness) that allows the rod to exhibit a degree of flexibility which is readily apparent through visual observation. The flexibility is not, however, unrestricted. Preferably, the amount of flexibility is such that the rod progressively becomes stiffer the more it is flexed. This is done to provide resistive, tactile feedback to the dog so that the dog will learn not to pull on the bicycle. It is also done to provide tactile feedback to the rider with respect to whether the dog is behaving inappropriately allowing the rider to correct the dog and/or prepare to take evasive action. In the present invention, the rod is generally normal or perpendicular to the bracket and exhibits its flexibility under bending loads.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
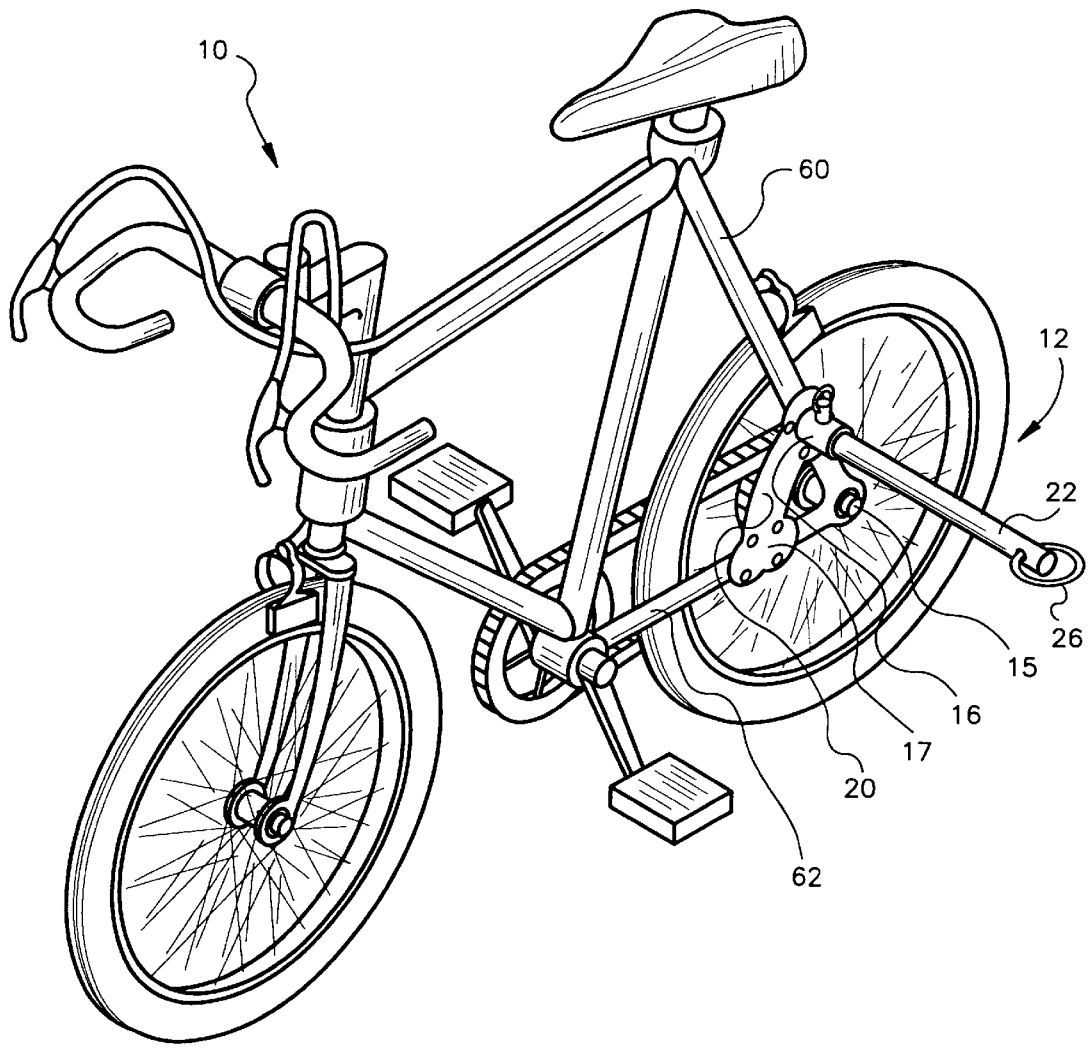
FIG. 1 is a perspective view of a dog exercising/walking device according to the teachings of the present invention, illustrated when mounted to a bicycle.

Referring now to the drawings, seen in FIG. 1 is a perspective view of a dog exercising/walking device (hereafter just "device") 12 according to the principles of the present invention. The device 12 is generally shown mounted to a bicycle 10. More specifically, the device 12 is mounted adjacent to lowermost portion of the bicycle's frame, near the intersection of horizontal rear arm 62 and inclined rear arm 60 which converge to the rear wheel mounting flange 15. This low mounting position is important because by lowering the position at which the dog is connected to the bicycle, it decreases the effective moment arm and thereby increases the amount of force or pull by the dog necessary to pull the bicycle 10 during use. While the device 12 is shown as being mounted to the left side of the bicycle 10, it should be noted that the device 12 may easily be converted for mounting on the right side of the bicycle 10.

The device 12 includes a bracket 20 that, when mounted to the bicycle 10, extends between a generally horizontally oriented rear arm 62 and the angled or inclined rear arm 60 of the bicycle's frame. The bracket 20 includes a front bracket 21 which has bone-shaped ends 17 with apertures 18. The apertures 18 are positioned to allow screws, bolts or other fastening members 14 to be threaded, inserted or extended through the apertures 18 and positioned on opposing sides of the rear arms 60 or 62 where the ends of the members 14 are engaged the nuts 19. The nuts 19 captively retain rear brackets or clamps 30 (seen in FIG. 2) on the opposite side of the rear arms 60 and 62. The rear brackets 30 are formed with a horseshoe shaped curvature (when seen in cross-section) that allows them to extend around the arms 60 and 62 and better secure the bracket 20 to the bicycle 10.

The ends 17 of the bracket 20 are oriented relative to one another such that the bracket 20 can be mounted to at an angle $\theta$ defined by the horizontal and angled rear arms 60 and 62. Preferably, the ends 17 are oriented such that a range of angles $\theta$ (between zero and ninety degrees) can be accommodated. As a result, the two rear arms 60 and 62 are retained between the brackets 21 and bracket 30 and the device 12 is mounted to the bicycle 10.

As can be seen from the side view the mounting bracket 20 is curved so that the bone shaped ends 17 will align themselves with the rear arms of a bicycle frame. While bracket 20 is shown as curving between boneshaped ends 17, the bracket 20 may also be sharply angled or straight between bone shaped ends 17.

Figure 2:
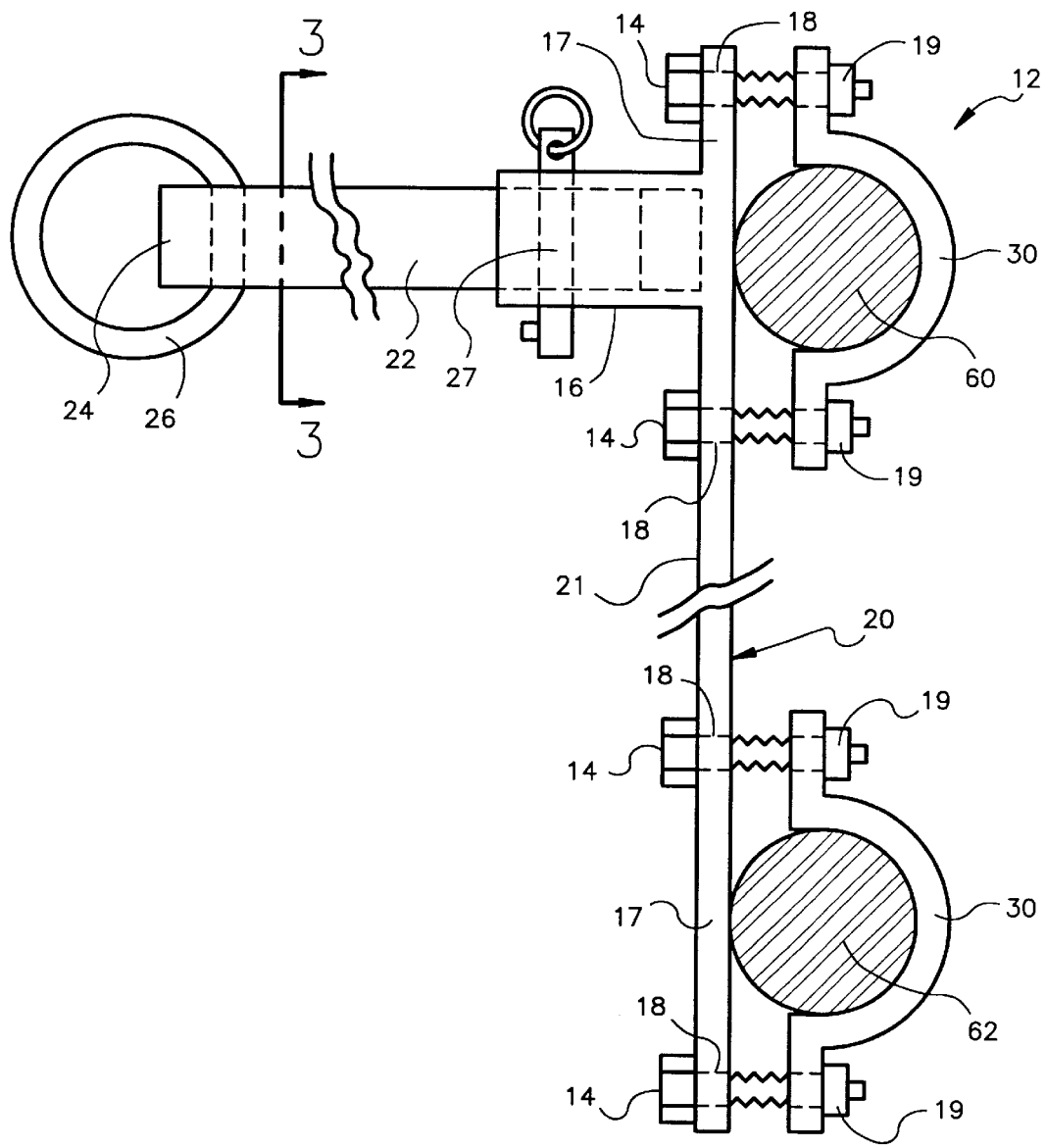
FIG. 2 is a rear elevational view of the present invention, generally taken along line 2—2 in FIG. 3, with the cross-sections being through the rear frame of the bicycle.
Figure 3:
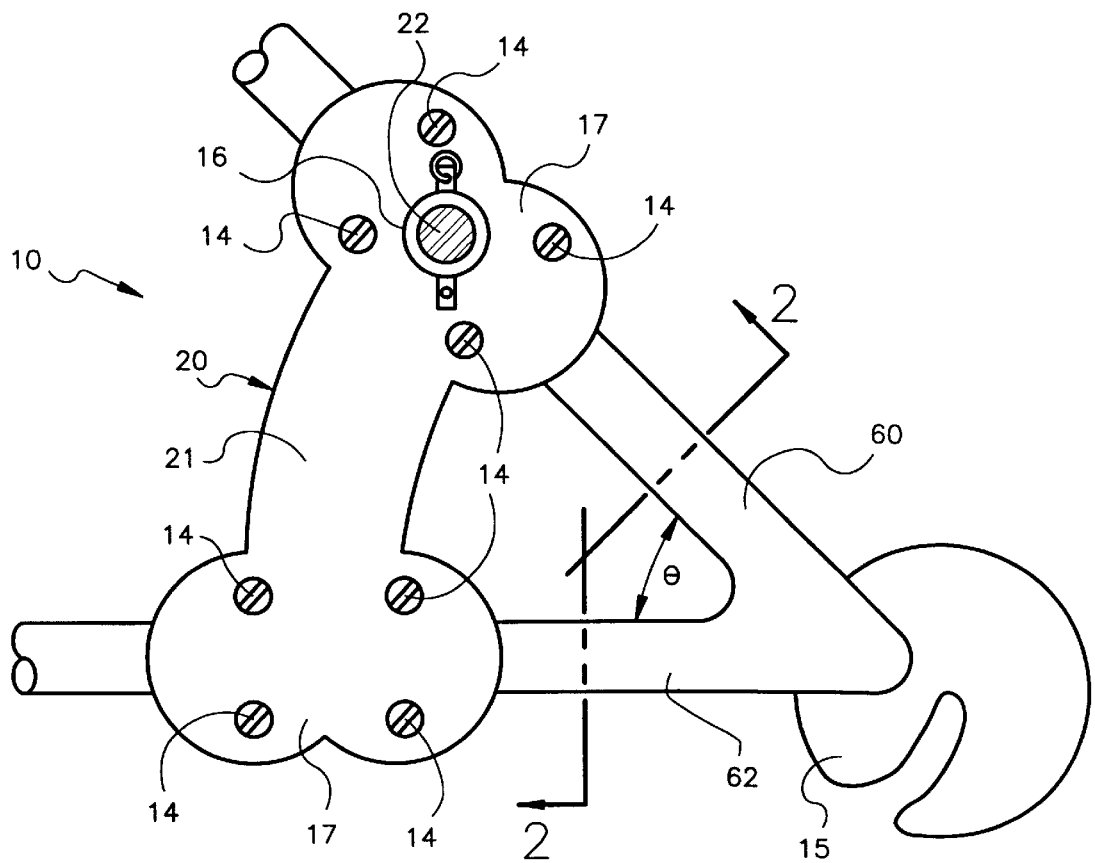
FIG. 3 is a sectional view of the present invention taken substantially along line 3—3 in FIG. 2.
Figure 4:
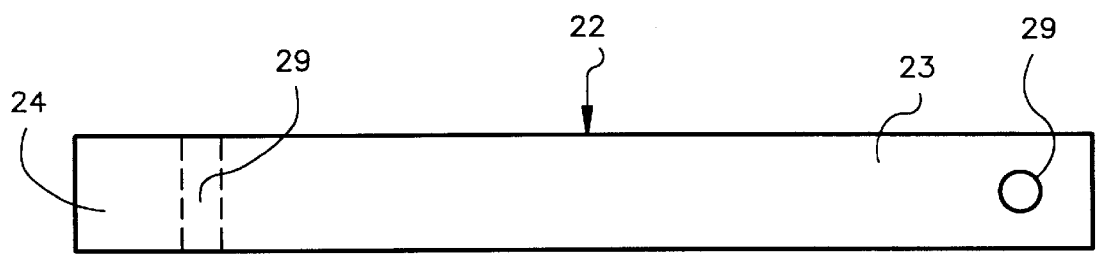
FIG. 4 is a plan view of the rod utilized in the present invention.

Seen in FIGS. 1 and 2, a collar 16 protrudes from one end 17 of the front bracket 21. In the figures, the collar 16 is seen positioned on the upper one of the two ends 17. If the bracket 21 were mounted to the opposing side of the bicycle 10, the collar 16 would be on the lower end 17 of the bracket 21. While preferably used on the lower end 17, to further increase the force required to pull the bicycle 10 over, this illustrated construction allows the device 12 to be used on either side of the bicycle 10 without significantly impacting performance or adding to manufacturing costs. If manufacturing costs are not a concern or if they are justified, a collar 16 can be attached to both ends 17 of the device 20. Generally, the collar 16 defines an extension having an opening that defines the entrance of a recess into which one end 23 of a rod 22 is inserted. The rod 22 is securely retained by a retainer pin 27, of conventional construction, inserted through a bore 29 in that end 23 of the rod 22 and opposing bores formed in the collar 16. The other end 24 of the rod 22 is provided with an attachment ring 26 to which a dog leash, tie-out or harness may be connected.

The rod 22 is composed of, but not limited to, a flexible or resilient material such as urethane, nylon, rubber, or plastic. The rod 22 is intended to be flexible in directions lateral to its length, but may also exhibit elasticity in the axial direction (the direction of its length) to attenuate the force exerted on the bicycle 10 when the dog moves laterally away from the bicycle 10. By being flexible, the rod 22 will attenuate most movement or forces generated by the dog so as to effectively isolate the bicycle 10 from any sudden or jerking by the dog. The dog will also be similarly protected by any sudden motions from the bicycle 10.

By locating the flexing action of the exercising device 12 in the horizontal portion of the rod 22, numerous benefits are derived over the prior art. These include reducing the effective moment arm as discussed above, increasing control over the dog, and providing better stability to the bicycle. Preferably, the length, diameter or thickness of the rod 22 is varied to provide for greater or less flexibility in the rod 22 depending on that desired by the rider and the size/strength of the dog. The rod 22 may be varied in length to space the dog farther from the bicycle 10.

The attachment ring 26 may be a split ring or other coupling member received in a bore 29 in the end 24 of the rod 22. The ring 26 can therefore be attached to a dog leash or harness by any known attachment mechanism including hooks, clasps and other quick release devices. Preferably, the bore 29 in the distal end 24 of the rod 22 is oriented ninety degrees from the bore 29 in the proximal end 23 of the rod 22. This allows the clasp on the end of the lead strap or tether to readily move fore and aft on the ring 26 with movement of the dog relative to the bicycle.

Figure 5:
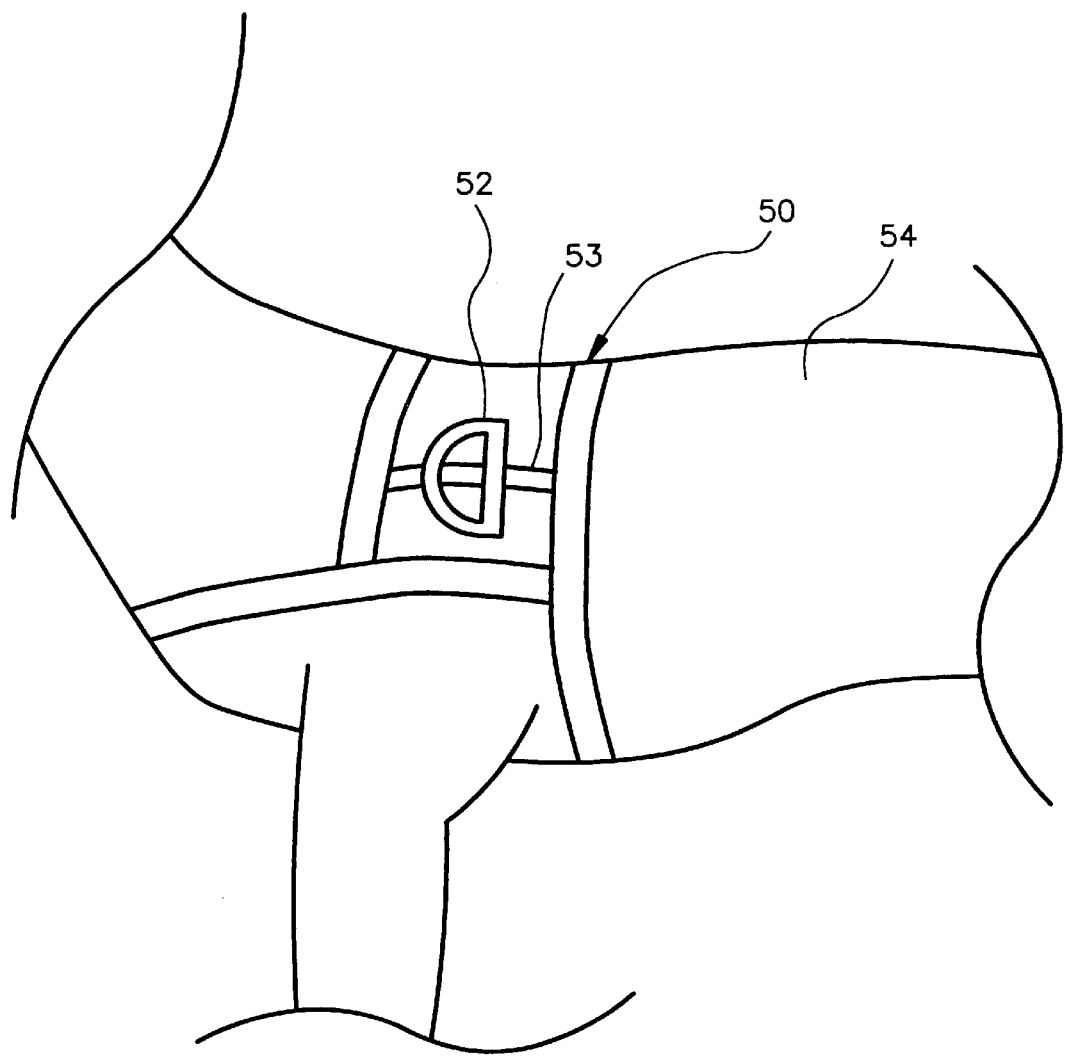
FIG. 5 is a partial perspective view of a dog harness according to another aspect of the present invention.

Typically, dog harnesses have an attachment ring located directly on the top of the harness so as to be located between the shoulders of the dog. When using such a dog harness with a bicycle mounted dog exerciser/walker, the harness has a tendency to rotate 90° about the dog in the direction of the bicycle. To eliminate this situation, one aspect of the present invention provides an attachment ring 52 located on a lateral side strap 53 of a dog harness 50. This is illustrated in FIG. 5 where the attachment ring 52, a "D-ring" is located on the harness 50 to be about mid-height on the dog 54. The harness 50 is provided with appropriate buckles and adjustments (not shown) to allow the webbing, made of nylon, leather or other material, to be properly sized to the dog 54. In securing the ring 52 to the harness 50, the ring 52 may be sewn thereto or attached to the end of a short strap extending off of the one of the straps on the side of the harness 50.

It is to be understood that the invention is not limited to the exact construction illustrated and described above, but that various changes and modifications may be made without departing from the spirit and scope of the invention as defined in the following claims.

I claim:

1. A dog-tethering device for mounting to a bicycle, said device comprising:

a mounting bracket having portions to engage and retain said device to the bicycle frame, said portions of said mounting bracket including two spaced apart ends to engage and retain said device between two parts of the bicycle frame, said two spaced apart portions of said mounting bracket define an angle of less than ninety degrees;

a member having first and second ends, said first end coupled to said mounting bracket and said second end extending away from said mounting bracket, said member being resiliently flexible in directions lateral to the length of said member; and an attachment member secured to said second end of said member to which a lead strap from the dog can be attached.

2. The dog-tethering device of claim 1 wherein said portions of said mounting bracket include an end portion, a clamp and a fastener forcing said clamp toward said end portion to clamp the bicycle frame between said end portion and said clamp.

3. The dog-tethering device of claim 1 wherein said member is removably coupled to said mounting bracket.

4. The dog-tethering device of claim 1 further comprising a collar secured to said mounting bracket, said member being removably coupled to said collar.

5. The dog-tethering device of claim 6 wherein said collar includes portions defining a recess, said member being received in said recess.

6. The dog-tethering device of claim 1 wherein said member is constructed of one of the following group of materials urethane, nylon, rubber, or plastic.

7. The dog-tethering device of claim 1 wherein said attachment member is secured to said second end of said member through a bore defined in said second end of said member.

8. The dog-tethering device of claim 7 wherein said bore in said second end of said member is oriented to be horizontal when in use.

9. A dog-tethering device for mounting to a bicycle, said device comprising:
    a mounting bracket having portions to engage and retain said device to the bicycle frame;
    a member having first and second ends, said first end coupled to said mounting bracket and said second end extending away from said mounting bracket, said member being resiliently flexible in directions lateral to the length of said member; and
    an attachment member secured to said second end of said member to which a lead strap from the dog can be attached; said member including a bore extending transversely through said first end;
    a collar secured to said mounting bracket, said member being removably coupled to said collar, said collar includes portions defining a recess, said member being received in said recess, said collar including a pair of opposed bores, said opposed bores being alignable with said bore of said member; and
    said device further comprising a retaining member inserted through said bore of said member and said opposing bores of said collar to removably couple said member to said collar.

10. The dog-tethering device of claim 9 wherein said portions of said mounting bracket include an end portion, a clamp and a fastener forcing said clamp toward said end portion to clamp the bicycle frame between said end portion and said clamp.

11. The dog-tethering device of claim 10 wherein said member is removably coupled to said mounting bracket.

12. The dog-tethering device of claim 10 wherein said member is constructed of one of the following group of materials urethane, nylon, rubber, or plastic.

13. The dog-tethering device of claim 10 wherein said attachment member is secured to said second end of said member through a bore defined in said second end of said member.

14. The dog-tethering device of claim 13 wherein said bore in said second end of said member is oriented to be horizontal when in use.

15. The dog-tethering device of claim 9 wherein said portions of said mounting bracket include two spaced apart ends to engage and retain said device between two parts of the bicycle frame.

16. The dog-tethering device of claim 15 wherein said two spaced apart portions of said mounting bracket define an angle of less than ninety degrees.

* * * * *